US011321760B2

United States Patent
Shin (10) Patent No.: US 11,321,760 B2
(45) Date of Patent: May 3, 2022

(54) PRODUCT SALES SYSTEM UTILIZING PRODUCT PURCHASE HISTORY, PRODUCT OF INTEREST, AND CUSTOMER REVIEW OF ACQUAINTANCE

(71) Applicant: Woonghee Shin, Gyeonggi-do (KR)

(72) Inventor: Woonghee Shin, Gyeonggi-do (KR)

( * ) Notice: Subject to any disclaimer, the term of this patent is extended or adjusted under 35 U.S.C. 154(b) by 2 days.

(21) Appl. No.: 16/202,057

(22) Filed: Nov. 27, 2018

(65) Prior Publication Data
US 2019/0362410 A1    Nov. 28, 2019

(30) Foreign Application Priority Data

May 25, 2018    (KR) ........................ 10-2018-0059493

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0214* (2013.01); *G06Q 30/0236* (2013.01); *G06Q 30/0282* (2013.01)

(58) Field of Classification Search
CPC ........... G06Q 30/0631; G06Q 30/0214; G06Q 30/0236; G06Q 30/0282; G06Q 30/0601–0645
USPC ...................................... 705/26.7, 26.1–27.2
See application file for complete search history.

(56) References Cited

U.S. PATENT DOCUMENTS

| 2002/0023076 | A1* | 2/2002 | Shishido | ............... G06F 16/954 |
| 2006/0085253 | A1* | 4/2006 | Mengerink | ............ G06Q 20/12 |
| | | | | 705/14.23 |
| 2009/0070228 | A1* | 3/2009 | Ronen | ................ G06Q 30/0601 |
| | | | | 705/26.1 |

(Continued)

FOREIGN PATENT DOCUMENTS

| KR | 10-2011-0022518 A | 3/2011 |
| KR | 10-2012-0071687 A | 7/2012 |

(Continued)

OTHER PUBLICATIONS

M. Brian, Your Facebook friends can now see your Amazon reviews, if you want them to, engadget, Nov. 13, 2013 (Year: 2013).*

*Primary Examiner* — Allison G Wood
*Assistant Examiner* — Anna Mae Mitros
(74) *Attorney, Agent, or Firm* — Korus Patent, LLC; Seong Il Jeong (57) ABSTRACT

A product sales system utilizing the product purchase history, product of interest, and customer review of an acquaintance, the product sales system includes: a former purchaser terminal configured to receive a customer review for a purchased product from a former purchaser and to register the customer review with a product sales server; a prospective purchaser terminal configured to connect with the product sales server, to select a product to be purchased, to receive an acquaintance customer review from the product sales server, and to display the acquaintance customer review; and the product sales server configured to register and store the customer review, to determine information about an acquaintance of the prospective purchaser who desires to purchase the selected product to be purchased, to extract an acquaintance customer review and to transmit the (Continued)

acquaintance customer review to the prospective purchaser terminal.

5 Claims, 6 Drawing Sheets

(56) References Cited

U.S. PATENT DOCUMENTS

| | | | | |
|---|---|---|---|---|
| 2012/0233020 A1* | 9/2012 | Eberstadt | ............... | G06Q 10/10 |
| | | | | 705/26.41 |
| 2014/0100991 A1* | 4/2014 | Lenahan | ............ | G06Q 30/0643 |
| | | | | 705/26.62 |
| 2014/0280524 A1* | 9/2014 | Paradise | ................ | G06Q 10/10 |
| | | | | 709/204 |
| 2015/0088700 A1* | 3/2015 | Hamilton | ............. | G06Q 10/087 |
| | | | | 705/28 |
| 2016/0350780 A1* | 12/2016 | G | ........................ | G06Q 30/0214 |

FOREIGN PATENT DOCUMENTS

| | | | |
|---|---|---|---|
| KR | 10-2012-0113407 | A | 10/2012 |
| KR | 10-2012-0119813 | A | 10/2012 |
| KR | 10-2013-0126559 | A | 11/2013 |
| KR | 10-2014-0075877 | A | 6/2014 |
| KR | 10-2014-0076671 | A | 6/2014 |
| KR | 10-2014-0091172 | A | 7/2014 |
| KR | 10-1609521 | B1 | 4/2016 |
| KR | 10-2016-0136081 | A | 11/2016 |

* cited by examiner

PRODUCT SALES SYSTEM UTILIZING PRODUCT PURCHASE HISTORY, PRODUCT OF INTEREST, AND CUSTOMER REVIEW OF ACQUAINTANCE

CROSS-REFERENCE TO RELATED APPLICATION

This application claims the benefit of Korean Patent Application No. 10-2018-0059493 filed on May 25, 2018, which is hereby incorporated by reference herein in its entirety.

BACKGROUND

1. Technical Field

The present invention generally to a product sales system, and more specifically to a product sales system utilizing the product purchase history, product of interest, and customer review of an acquaintance.

2. Description of the Related Art

Currently, with the development of Internet technology, customer reviews can be easily accessed via an electronic commerce system designed to sell various products online and blogs. With the development of wired/wireless Internet technology and the development of mobile terminal technology for computer terminals, smartphones, smart pads, etc. used over wired/wireless Internet networks, ubiquitous computing environments have been established to enable users to access the Internet and electronic commerce anytime and anywhere.

As the Internet has been developed and ubiquitous computing environments have been established, the number of Internet shopping malls selling various products over the Internet is increasing, and the number of purchasers who connect with Internet shopping malls and purchase products via computer terminals and mobile terminals is also increasing.

Furthermore, the number of persons who provide and share customer reviews over the Internet after using offline shops (restaurants, hotels, etc.) or purchasing products is increasing.

Accordingly, the Internet advertisement and Internet information provision of products have become a very important sales route for the promotion and sales of the products, and have become a very important factor in the decision making of users.

In line with this, various advertisement technologies that can efficiently perform advertisement over the Internet have been developed and applied to various websites. An Internet shopping mall designed to sell products by means of various product sales methods, i.e., an Internet product sales system, and a system designed to introduce offline shops have been developed and applied.

However, prospective purchasers cannot view products (including service and content) advertised over the Internet or sold through an Internet shopping mall before purchase, and thus the reliability of the products cannot be secured. Upon decision making for the use of an offline shop (a restaurant, a hotel, or the like), a user can make a decision only for provided information.

Accordingly, prospective purchasers cannot view actual products in connection with products sold in an electronic commerce system, and receive help for decision making for the purchase of a product or the use of an offline shop (a restaurant, a hotel, or the like) from customer reviews.

However, it is inevitable that the reliability of the customer reviews of unacquainted persons is not secured. There are cases where counterfeit products are sold in an electronic commerce system. Furthermore, there are cases where customer reviews for products are manipulated. As a result, purchasers are suffering from these problems.

In the case of used product trade in an electronic commerce system, it is inevitable to purchase products depending on the reliability of vendors. Furthermore, there occur cases where this is exploited.

There is the demand for a new method for securing the reliability of products sold in an electronic commerce system. Meanwhile, when rewards are provided for customer reviews that have assisted prospective purchasers in purchasing products, problems arise in that only favorable evaluations may be provided via customer reviews intended to induce the purchase of products and in that there may be provided favorable information including the subjective opinions of an authors or the intentions of vendors in connection with the provision of customer reviews for products or off-line shops (restaurants, hotels, etc.) over the Internet.

PRIOR ART DOCUMENT

Patent Document (Patent document 0001) Korean Patent Application Publication No. 10-2012-0113407

SUMMARY

An object of the present invention is to provide a new type of electronic commerce that assists in the purchase decision making of a prospective purchaser via reliable customer review information by providing the product purchase history, product-of-interest, and customer review information of an acquaintance, associated with the prospective purchaser via a social network service or human network, rather than a general customer review.

Another object of the present invention is to provide a means that acquires detailed reliable product information via a customer review for a product to be purchased and questions and answers for the product to be purchased made with an acquaintance when a product purchase history and customer review of the acquaintance associated via a social network service or human network is present for a product that a prospective purchaser desires to purchase.

Another object of the present invention is to provide a means that provides a frank customer review and opinion to an acquaintance when a prospective purchaser has purchased a product of interest of the acquaintance earlier than the acquaintance with reference to information about the product of interest of the acquaintance.

Another object of the present invention is to provide a means that provides part of a purchase price to an acquaintance having assisted in purchase decision making as a reward when a prospective purchaser has made a purchase by reference to the product purchase history and product-of-interest information of the acquaintance associated via a reliable social network service or human network.

Another object of the present invention is to provide a reliable means that displays used product sales information to a prospective purchaser when an acquaintance of the prospective purchaser desires to sell a used product for a product to be purchased.

According to an aspect of the present invention, there is provided a product sales system utilizing the product purchase history, product of interest, and customer review of an acquaintance, the product sales system including: a former purchaser terminal adapted to be used by a former purchaser, and configured to receive a customer review for a purchased product from the former purchaser and to register the customer review with a product sales server; a prospective purchaser terminal adapted to be used by a prospective purchaser who desires to purchase a product, and configured to connect with the product sales server, to select a product to be purchased, to receive an acquaintance customer review, which a customer review registered by an acquaintance of the prospective purchaser, among customer reviews of former purchasers allocated and registered for the selected product to be purchased from the product sales server, and to display the acquaintance customer review; and the product sales server configured to register and store the customer review, registered by the former purchaser terminal, for each product, to determine information about an acquaintance of the prospective purchaser who desires to purchase the selected product to be purchased, to extract an acquaintance customer review, which is a customer review registered by the acquaintance of the prospective purchaser from among customer reviews of former purchasers registered for the product to be purchased, which is selected by the prospective purchaser terminal, and to transmit the acquaintance customer review to the prospective purchaser terminal.

The product sales server may include: a membership sign-up management unit configured to manage the membership sign-up of the former purchaser and the prospective purchaser; a product management unit configured to store product information for each product to be sold, and configured to provide product information about a product, requested by the prospective purchaser, to the prospective purchaser terminal; a matching management unit configured to determine the information about the acquaintance of the prospective purchaser who desires to purchase the selected product to be purchased, to extract the acquaintance customer review, registered by the acquaintance, from customer reviews for the product to be purchased, and to match the acquaintance customer review with the prospective purchaser; a customer review management unit configured to register and store the customer review registered by the former purchaser terminal for each product, and to provide the acquaintance customer review of the acquaintance of the prospective purchaser, matched via the matching management unit, to the prospective purchaser terminal; and a sales management unit configured to manage payment and delivery information, entered for a product purchase by the prospective purchaser who has examined the acquaintance customer review.

The former purchaser terminal may register information about a product of interest, which has not been actually purchased and in which the former purchaser is interested, with the product sales server; the product sales server may include a product-of-interest management unit configured to register and store information about a product of interest of a member registered with the membership sign-up management unit; and the customer review management unit may extract the information about a product of interest, in which the acquaintance of the prospective purchaser is interested, from registered information about products of interests, and may provide the extracted information about a product of interest to the prospective purchaser terminal.

The sales management unit, when the prospective purchaser has purchased a product matching the customer review of the acquaintance or has purchased a product matching the information about a product of interest of the acquaintance earlier than the acquaintance, may subtract a preset amount of money from a product purchase money of the prospective purchaser, and may provide points to the acquaintance as a reward.

The matching management unit determining the information about the acquaintance of the prospective purchaser may be performed by requesting SNS friend account information while providing information about the prospective purchaser to a social network service server, receiving the SNS friend account information of the prospective purchaser from the social network server, and determining the information about the acquaintance of the prospective purchaser.

The matching management unit determining the information about the acquaintance of the prospective purchaser may be performed by requesting a telephone number DB of the prospective purchaser, registered in the prospective purchaser terminal, from the prospective purchaser terminal and then determining the information about the acquaintance of the prospective purchaser or by requesting a telephone number DB of the prospective purchaser from a cloud server and then determining the information about the acquaintance of the prospective purchaser.

The matching management unit may determine that the former purchaser provides a product purchase history and a customer review to an acquaintance of the former purchaser, and, when the former purchaser does not want to provide the product purchase history and the customer review to the acquaintance of the former purchaser, may exclude the purchase history and customer review information from matching of corresponding product information.

The product sales server may include a customer review inquiry unit configured to provide a question & answer window that enables product questions and answers to be made between acquaintances who have registered acquaintance customer reviews for a product to be purchased, which is selected by the prospective purchaser.

The product sales server may receive used product sales information from the former purchaser who desires to sell a purchased product as a used product, and may store the used product sales information; and the customer review management unit, when used product sales information matching the product to be purchased of the prospective purchaser is present in used product sales information registered by an acquaintance of the prospective purchaser, may provide the matching used product sales information of the acquaintance to the prospective purchaser terminal.

The customer review management unit, when used product sales information matching the product to be purchased of the prospective purchaser is not present in used product sales information registered by the acquaintance of the prospective purchaser but corresponding used product sales information registered by a third acquaintance, which is a person associated with the acquaintance of the prospective purchaser, may provide the used product sales information of the third acquaintance to the prospective purchaser terminal, and receives an evaluation of the third acquaintance from the acquaintance of the prospective purchaser, and may provide the evaluation of the third acquaintance to the prospective purchaser terminal.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

The advantages and features of the present invention and methods for achieving them will be apparent from embodiments that will be described in detail below with reference to the accompanying drawings. However, the present invention is not limited to the embodiments disclosed below, but may be implemented in various different forms. The described embodiments are provided to fully convey the scope of the present invention to those having ordinary knowledge in the art to the present invention pertains, and the present invention is defined by the scope of the attached claims. Furthermore, the following description of the present invention, when it is determined that a detailed description of a related well-known configuration or function may make the gist of the present invention obscure, the detailed description will be omitted.

Figure 1:
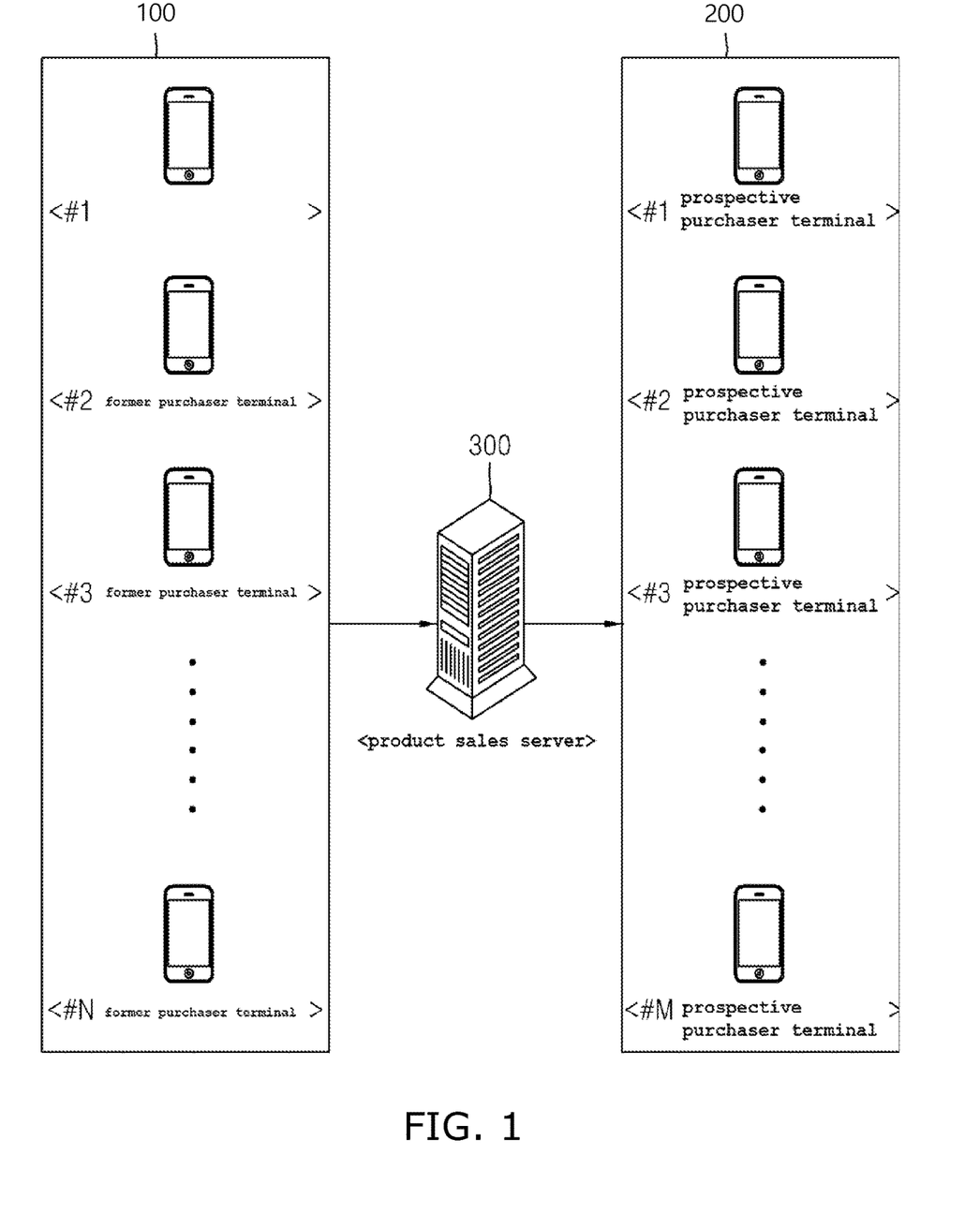
FIG. 1 is a diagram showing the configuration of a product sales system utilizing the product purchase history, product of interest, and customer review of an acquaintance according to an embodiment of the present invention.
Figure 2:
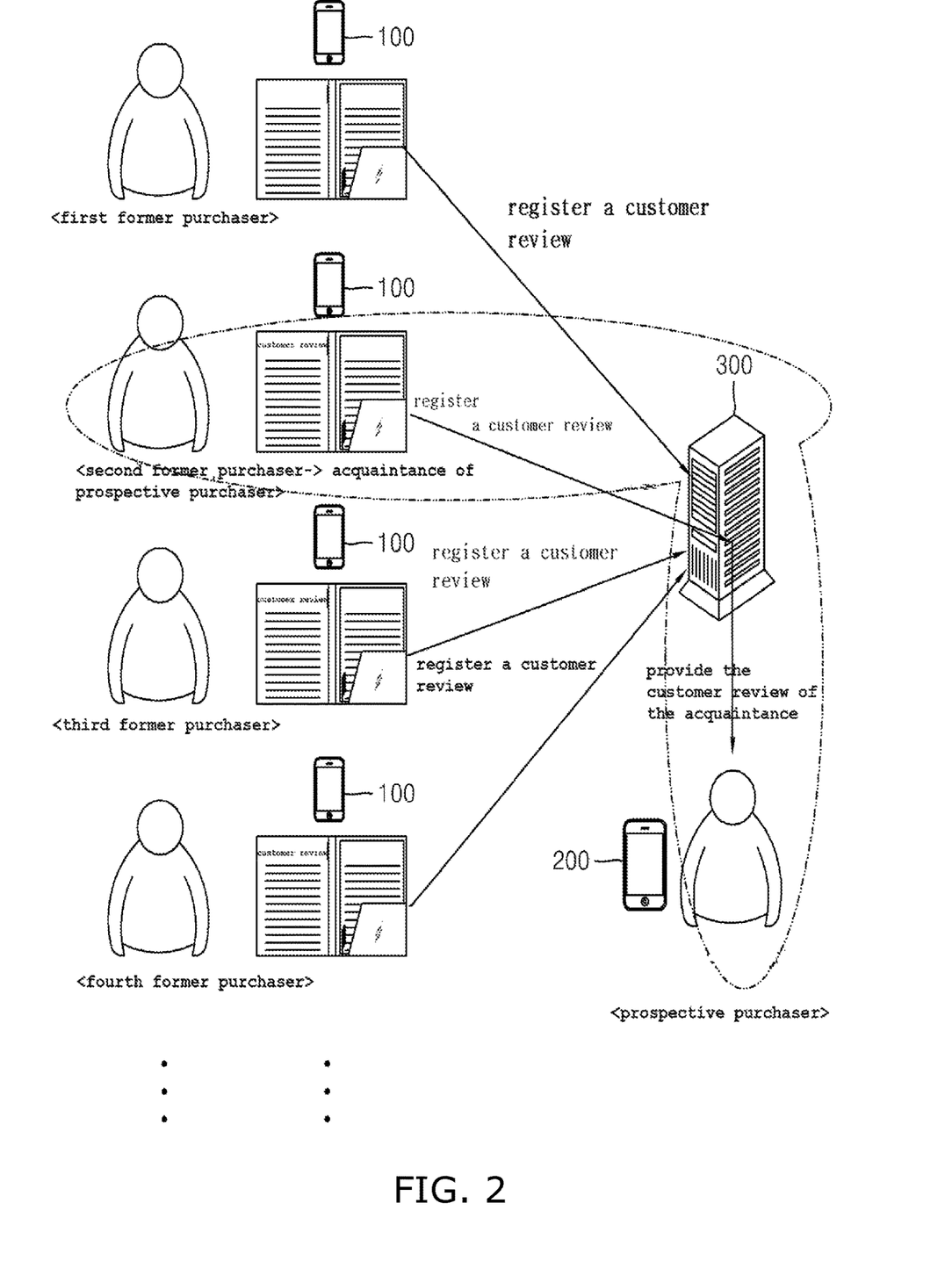
FIG. 2 is a diagram showing a prospective purchaser who examines the customer reviews of acquaintances for a product to be purchased according to an embodiment of the present invention.

FIG. 1 is a diagram showing the configuration of a product sales system utilizing the product purchase history, product of interest, and customer review of an acquaintance according to an embodiment of the present invention, and FIG. 2 is a diagram showing a prospective purchaser who examines the customer reviews of acquaintances for a product to be purchased according to an embodiment of the present invention.

The present invention exposes the customer review, purchase history, and product-of-interest information of an acquaintance, among purchase histories and customer reviews for a product that a purchaser desires to purchase, through the matching of the account information of a friend of a social network service and a telephone number via an application program interface (API), provided by a social network service provider, by means of the telephone number and the account information of the social network service provided upon sign-up for an electronic commerce system.

The prospective purchaser may inquire about a customer review for a product to be purchased via the electronic commerce system account of an acquaintance and the account of a friend of a social network service. A reward based on created profits is provided to an existing member who has assisted in the product purchase decision making of a prospective purchaser via a frank customer review of a former purchaser.

For this purpose, as shown in FIG. 1, the product sales system utilizing the product purchase history, product of interest, and customer review of an acquaintance according to the present invention may include a wired/wireless communication network (not shown), former purchaser terminals 100, a prospective purchaser terminal 200, and a product sales server 300.

The wired/wireless communication network (not shown) provides wired/wireless communication between the former purchaser terminals 100 and the product sales server 300 and between the prospective purchaser terminal 200 and the product sales server 300. When the wired/wireless communication network (not shown) is implemented as a wireless communication network, data communication can be performed using a wireless mobile communication network including a base transceiver station (BTS), a mobile switching center (MSC), and a home location register (HLR). Furthermore, when the wired/wireless communication network (not shown) is implemented as a wired communication network, the wired communication network may be implemented as a network communication network. In this case, data communication may be performed in accordance with an Internet protocol, such as the Transmission Control Protocol/Internet Protocol (TCP/IP), or the like.

Each of the former purchaser terminals 100 is a terminal that is used by a former purchaser who has a product history. Although the former purchaser terminal 100 is shown as a smartphone as an example in the drawings, the former purchaser terminal 100 may include not only a smartphone but also a desktop personal computer (PC), a tablet PC tablet PC, a slate PC, a notebook computer, etc. It will be apparent that a terminal to which the present invention is applicable is not limited to the above-described types of terminals but may include all terminals that can communicate with an external device.

The former purchaser terminal 100 receives a customer review for a purchased product from the former purchaser, and registers the customer review with the product sales server 300. For example, when a first former purchaser has purchased product A, a customer review of the first former purchaser for the product A is registered with the product sales server 300 via the first former purchaser terminal 100. When the first former purchaser has purchased product B, a customer review of the first former purchaser for the product B is registered with the product sales server 300 via the first former purchaser terminal 100.

In the same manner, when a second former purchaser has purchased the same product A, a customer review of the second former purchaser for the product A is registered with the product sales server 300 via a second former purchaser terminal 100. When the second former purchaser has purchased the product B, a customer review of the second former purchaser for the product B is registered with the product sales server 300 via the second former purchaser terminal 100.

In this case, the customer review may correspond to one of various customer reviews, such as a product customer review, a product quality evaluation, a product design evaluation, an offline shop (a restaurant, a hotel, or the like) customer review, etc., and may be received in various forms, such as text, photo and voice forms, etc.

Furthermore, the former purchaser terminal 100 may register information about a product of interest, which has not been actually purchased and in which the former purchaser is interested, with the product sales server 300. For example, the former purchaser may register a product, in which the former purchaser is interested in order to purchase it, with the product sales server 300 as a product of interest.

Furthermore, the information about a product of interest of the former purchaser registered as described above is received from the product sales server 300, and displays the information about a product of interest of an acquaintance on the prospective purchaser terminal 200.

The prospective purchaser terminal 200 is a terminal that is used by the prospective purchaser who desires to purchase a product. In the same manner, the prospective purchaser terminal 200 may include not only a smartphone but also various communication terminals, such as a desktop PC, a notebook, a tablet, etc.

The prospective purchaser terminal 200 connects with the product sales server 300, selects a product to be purchased, receives an acquaintance customer review, i.e., a customer review registered by an acquaintance of the prospective purchaser, among the customer reviews of the former purchasers allocated and registered for the selected product to be purchased from the product sales server 300, and displays the acquaintance customer review.

For example, as shown in FIG. 2, when the prospective purchaser desires to purchase the product A and the plurality of customer reviews of former purchasers for the product A to be purchased is present in the product sales server 300, the customer review of the second former purchaser, i.e., an acquaintance of the prospective purchaser, is provided to the prospective purchaser. Accordingly, the prospective purchaser can view a frank product customer review of the acquaintance among the plurality of product customer reviews, and can thus acquire reliable product evaluation information via the acquaintance, other than a third party.

Furthermore, detailed and reliable product information can be acquired through the exchange of questions and answers for the product to be purchased with the acquaintance.

The product sales server 300 has the same configuration as a common web server in terms of hardware, and includes a program module implemented via one or more of various languages, such as C, C++, Java, Visual Basic, Visual C, etc., and configured to perform various functions in terms of software. Furthermore, the product sales server 300 may be implemented using one of web server programs that are provided to common hardware for a server in various forms depending on operating systems, such as Dos, Windows, Linux, Unix, Macintosh, etc.

The product sales server 300 registers and stores the customer reviews, registered by the former purchaser terminals 100, for respective products. The product sales server 300 determines information about an acquaintance of the prospective purchaser who desires to purchase a selected product to be purchased, extracts an acquaintance customer review, i.e., a customer review registered by the acquaintance of the prospective purchaser, from among the customer reviews of former purchasers registered for the product to be purchased, which is selected by the prospective purchaser terminal 200, and transmits the extracted acquaintance customer review to the prospective purchaser terminal 200.

The product sales server 300 will be described below in conjunction with FIG. 3.

Figure 3:
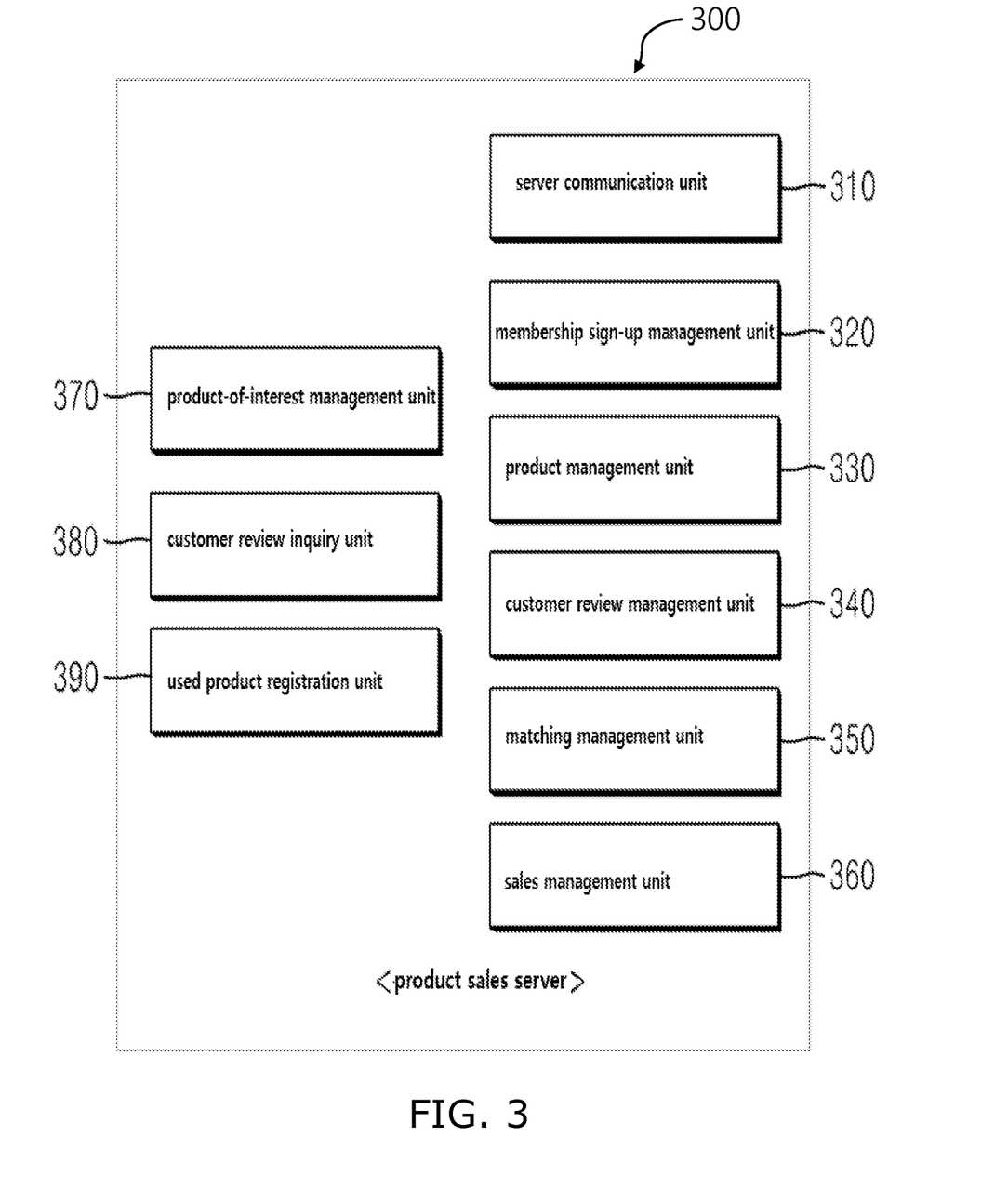
FIG. 3 is a block diagram showing the configuration of a product sales server according to an embodiment of the present invention.
Figure 4:
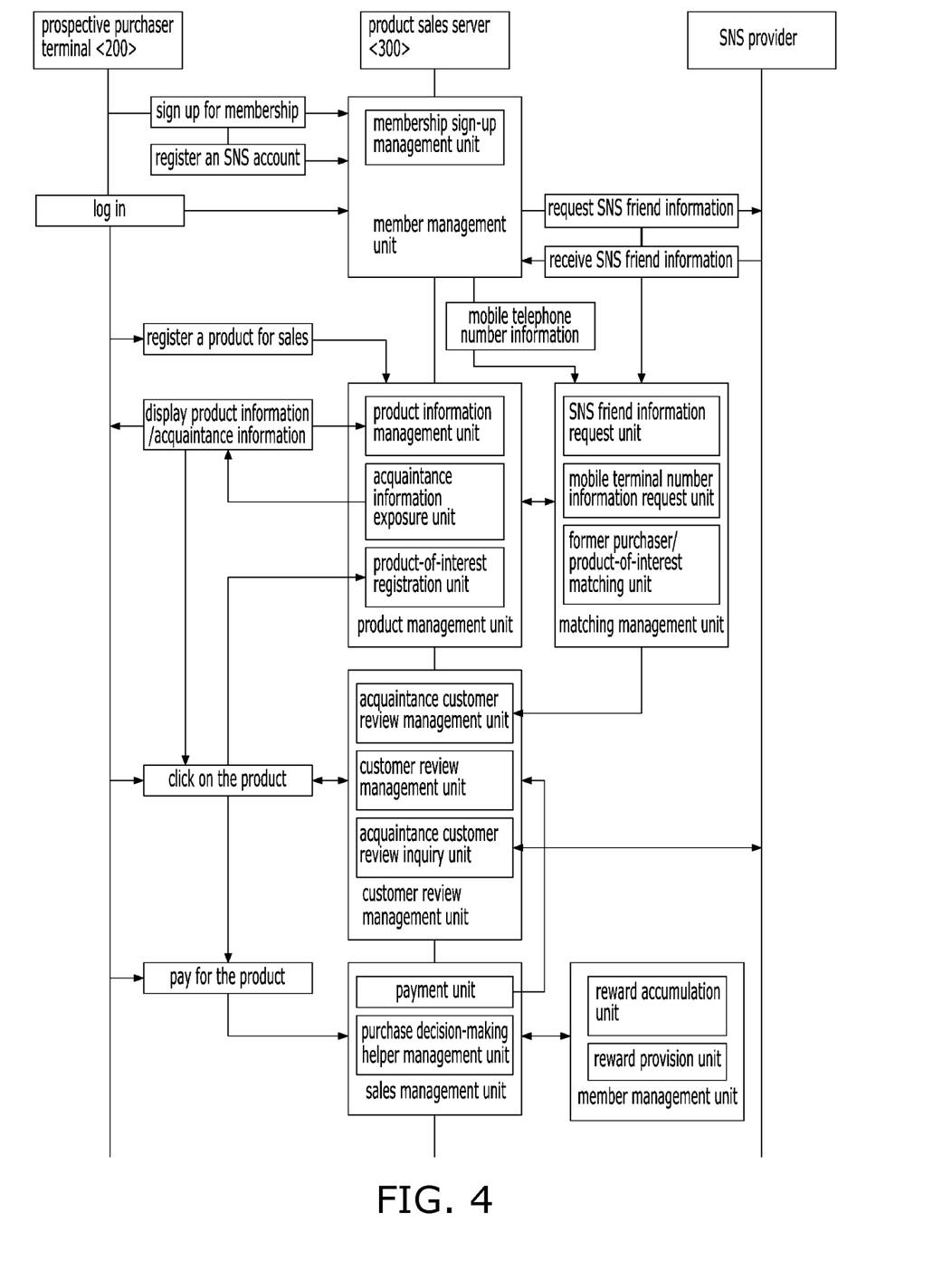
FIG. 4 is a flowchart showing an overall process according to an embodiment of the present invention.
Figure 5:
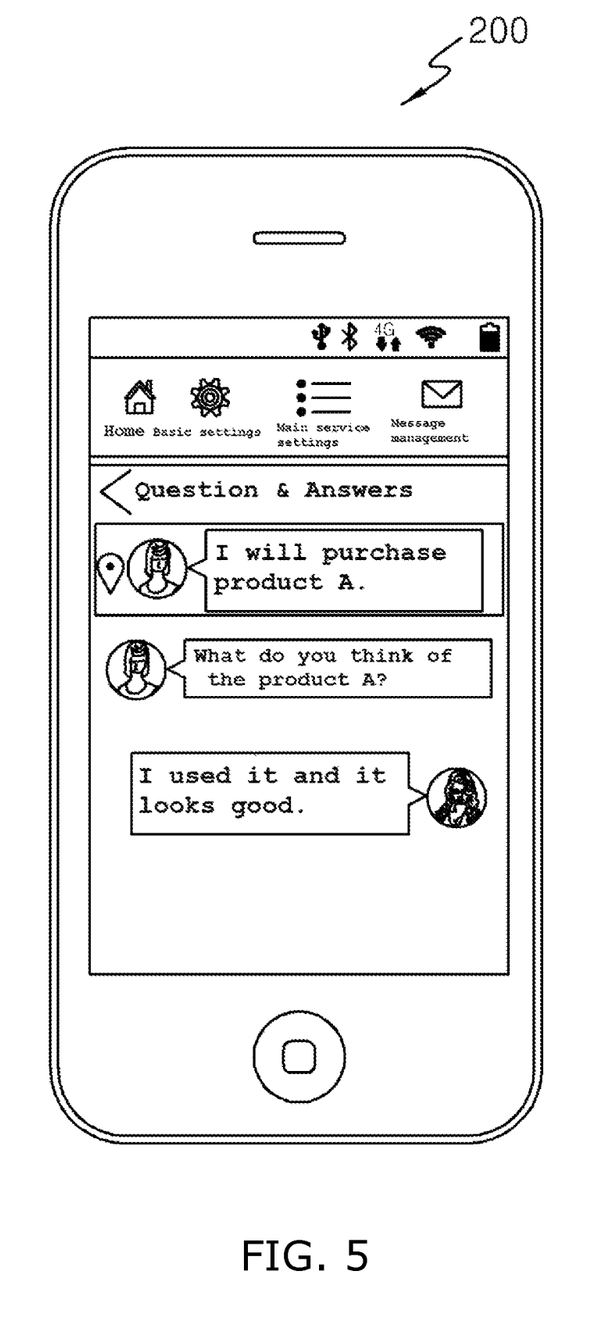
FIG. 5 is a view showing an example of a question & answer window according to an embodiment of the present invention.
Figure 6:
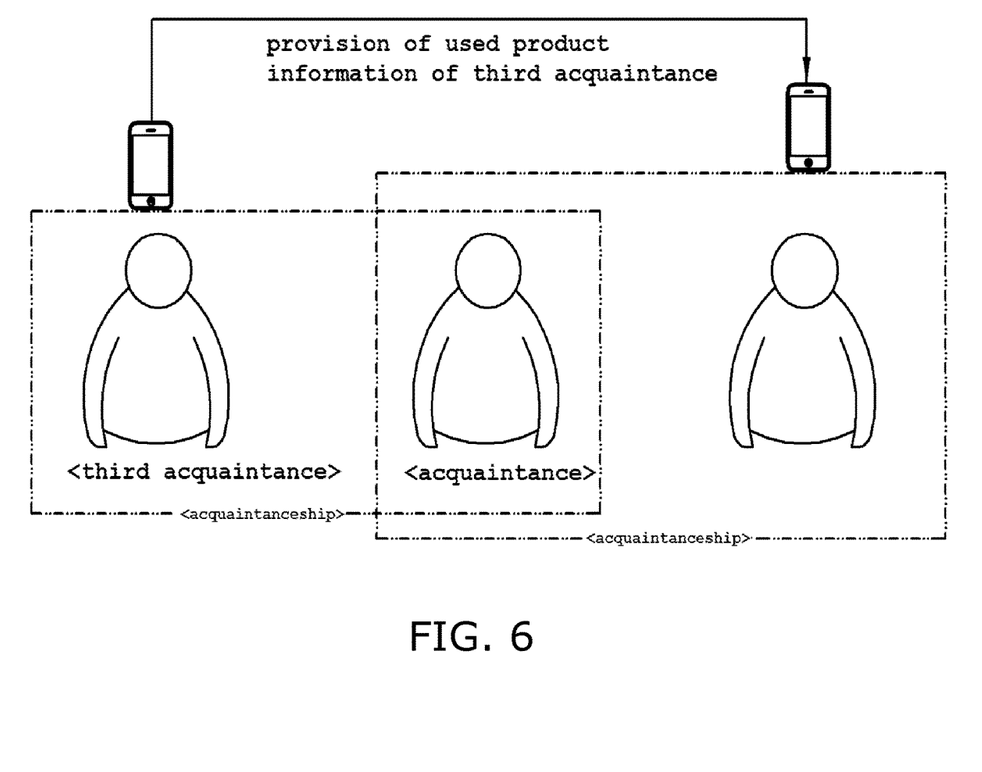
FIG. 6 is a view showing the state of providing information about a used product sold by a third acquaintance of a prospective purchaser according to an embodiment of the present invention.

FIG. 3 is a block diagram showing the configuration of a product sales server according to an embodiment of the present invention, FIG. 4 is a flowchart showing an overall process according to an embodiment of the present invention, FIG. 5 is a view showing an example of a question & answer window according to an embodiment of the present invention, and FIG. 6 is a view showing the state of providing information about a used product sold by a third acquaintance of a prospective purchaser according to an embodiment of the present invention.

As shown in FIG. 3, the product sales server 300 may include a server communication unit 310, a membership sign-up management unit 320, a product management unit 330, a customer review management unit 340, a matching management unit 350, and a sales management unit 360. The product sales server 300 may further include a product-of-interest management unit 370, a customer review inquiry unit 380, and a used product registration unit 390.

The server communication unit 310 provides the function of communicating with the former purchaser terminals 100 and the prospective purchaser terminal 200. In other words, the server communication unit 310 supports the protocols of hardware and software for communication with the former purchaser terminals 100 and the prospective purchaser terminal 200. The server communication unit 310 may support data communication in accordance with an Internet protocol, such as the Transmission Control Protocol/Internet Protocol (TCP/IP), or the like.

The membership sign-up management unit 320 performs the function of managing the membership sign-up of the former purchasers and the prospective purchaser. Each of the former purchasers and the prospective purchaser registers an ID, a password, an address, a name, contact information, etc. upon sign-up for membership. The membership sign-up management unit 320 stores and manages the information of each member. For reference, the member information may be provided inside a device in the form of a module to and from which information can be input and output, such as a hard disk drive, a solid state drive (SSD), flash memory, a compact flash (CF) card, a secure digital (SD) card, a smart media (SM) card, a multi-media card (MMC), a memory stick, or the like, or may be encrypted and stored in a separate device.

The product management unit 330 stores pieces of product information for respective products to be sold, and provides product information for a product, requested by the prospective purchaser, to the prospective purchaser terminal 200. In this case, the product information may correspond to information, such as a photo of a product of an electronic commerce system, a photo of a product of an offline shop (a famous restaurant, a hotel, or the like), animation content, a voice product introduction, product specifications, detailed product information, conditions for the returning of a product, and/or the like.

The matching management unit 350 determines information about an acquaintance of the prospective purchaser who desires to purchase a selected product to be purchased. A method of determining information about an acquaintance of the prospective purchaser may include two methods below:

A first method is a method using a social network service (SNS). In other words, as shown in FIG. 4, information about an acquaintance of the prospective purchaser is determined by requesting SNS friend account information while providing the information of the prospective purchaser to a social network service server, receiving the SNS friend account information of the prospective purchaser from a social network server, and determining the information about an acquaintance of the prospective purchaser.

A second method is a method using its own network information. In other words, as shown in FIG. 4, information about an acquaintance of the prospective purchaser is determined by requesting the telephone number DB of the prospective purchaser, registered in the prospective purchaser terminal 200, from the prospective purchaser terminal 200 and then determining the information about the acquaintance of the prospective purchaser or by requesting the telephone number DB of the prospective purchaser from a cloud server and then determining the information about the acquaintance of the prospective purchaser.

Furthermore, the matching management unit 350 extracts an acquaintance customer review, a product of interest, and used product registration information, registered by the acquaintance, from among customer reviews for the product to be purchased, and matches the extracted information with the prospective purchaser. When the acquaintances of the prospective purchaser who desires to purchase the product A include the first former purchaser and the second former purchaser who have registered customer reviews for the product A, the matching management unit 350 matches a customer review for the product A registered by the first former purchaser and a customer review for the product A registered by the second former purchaser with the prospective purchaser.

Alternatively, when an acquaintance of the prospective purchaser who desires to purchase the product A has registered the product A as a used product for trade, corresponding information is matched with the prospective purchaser.

Alternatively, when an acquaintance of the prospective purchaser who desires to purchase the product A has registered the product A as a product of interest, corresponding information is matched with the prospective purchaser.

The matching management unit 350 may determine that a former purchaser provides a product purchase history and a customer review to an acquaintance of the former purchaser. When the former purchaser does not want to provide the product purchase history and the customer review to the acquaintance of the former purchaser, the matching management unit 350 excludes the purchase history and customer review information from the matching of corresponding product information.

In other words, when the former purchaser does not want to provide the customer review, product-of-interest, and used product trade registration information of the former purchaser to the acquaintance of the former purchaser, the matching management unit 350 excludes the corresponding information from matching with the prospective purchaser. When the prospective purchaser desires to purchase the product A, the first former purchaser and the second former purchaser have registered customer reviews for the product A, and the second purchaser does not want to provide a purchase history, a customer review, a product of interest, and used product trade registration information for the corresponding product to an acquaintance, only the customer review for the product A registered by the first former purchaser is matched with the prospective purchaser and then provided.

The product-of-interest management unit 370 registers and stores the information about a product of interest of a member registered with the membership sign-up management unit 320. The product-of-interest management unit 370 may register information about a product of interest, which has not been actually purchased and in which the member is interested, with the product sales server 300.

Furthermore, the product-of-interest management unit 370 may extract information about a product of interest, in which an acquaintance of the prospective purchaser is interested, from pieces of information about products of interest registered by former purchasers, and may provide the extracted information to the prospective purchaser terminal 200. For example, when a plurality of pieces of information about products of interest has been registered for respective former purchasers, only information about a product of interest in which an acquaintance of the prospective purchaser is interested is provided to the prospective purchaser terminal 200. Accordingly, the prospective purchaser can view the information about a product of interest in which his or her acquaintance is interested.

Furthermore, in connection with the provision of information about a product of interest to an acquaintance of a member who has registered a product of interest, the product-of-interest management unit 370 may allow the selection of whether to disclose information to an acquaintance of a member for each product of interest. Information about a product of interest that has been selected for disclosure to an acquaintance is provided along with information about an acquaintance of the prospective purchaser. In contrast, information about a product of interest that has not been selected for disclosure to an acquaintance is not provided to an acquaintance of the prospective purchaser.

The customer review management unit 340 performs the function of registering and storing customer reviews, registered by the former purchaser terminals 100, for respective products. In this case, each of the customer reviews may correspond to one of various customer reviews, such as a customer review for a product of an electronic commerce system, a customer review for a product of an offline shop (a famous restaurant, a hotel, or the like), a product quality evaluation, a product design evaluation, etc., and may correspond to one of various types of content in text, photo and voice forms, etc.

The customer review management unit 340 provides the customer review of the acquaintance of the prospective purchaser, matched by the matching management unit 350, to the prospective purchaser terminal 200. As shown in FIG. 2, the reliability of a customer review can be improved by providing the customer review of the acquaintance of the prospective purchaser to the prospective purchaser.

Furthermore, the customer review management unit 340 may extract information about a product of interest, in which an acquaintance of the prospective purchaser is interested, from information about products of interest registered by the former purchasers, and may provide the extracted information to the prospective purchaser terminal 200. For example, when pieces of information about products of interest have been registered for the respective former purchasers, only the information about a product of interest of an acquaintance of the prospective purchaser is provided to the prospective purchaser terminal 200. Accordingly, the prospective purchaser may view information about a product in which his or her acquaintance is interested.

The sales management unit 360 manages payment and delivery information entered for a product purchase by the prospective purchaser who has examined the customer review of the acquaintance. For example, when the prospective purchaser who has read the customer review of the acquaintance for the product A wants to purchase the product A, the sales management unit 360 deals with a payment for the purchase of the product A, receives delivery information for the delivery of the product A, and outputs instructions to ship the product A.

Furthermore, the sales management unit 360 gives a reward to the acquaintance who has assisted in the purchase decision making of the prospective purchaser. For this purpose, when the prospective purchaser has purchased a product matching the customer review of the acquaintance or has purchased a product matching the information about a product of interest of the acquaintance earlier than the acquaintance, the sales management unit 360 subtracts a preset amount from the product purchase price of the prospective purchaser, and provides points to the acquaintance as a reward.

Furthermore, the sales management unit 360 may manage a final purchase decision of a purchaser for a purchased product, and may allow the selection of whether to provide purchase history/customer review information for a product, for which the final purchase decision of the purchaser has been made, to an acquaintance.

The customer review inquiry unit 380 provides a question & answer window configured to enable product questions and answers between a purchaser who has selected a product to be purchased and an acquaintance who has registered an acquaintance customer review for a product to be purchased, which is selected by the prospective purchaser. For example, as shown in FIG. 5, a chat window may be provided between the prospective purchaser and an acquaintance so that separate questions & answers can be made.

A chat between acquaintances may be made by means of a social network application via an application program interface (API) provided by a social network service provider, or may be made by means of a separate chat window.

The used product registration unit 390 receives used product sales information from one of the former purchasers who desires to sell a purchased product as a used product, and stores the used product sales information.

Accordingly, when used product sales information matching a product to be purchased of the prospective purchaser is present in the pieces of used product sales information registered by acquaintances of the prospective purchaser, the customer review management unit 340 may provide the matching used product sales information of the acquaintance to the prospective purchaser terminal 200.

Therefore, if an acquaintance of the prospective purchaser sells a used product identical to a product that the prospective purchaser desires to purchase when the prospective purchaser purchases the product, the prospective purchaser can purchase the used product with reliability.

The quality of a used product cannot be ensured when the used product is purchased from an unacquainted third party, whereas the quality of a used product is guaranteed when the used product is purchased from an acquaintance. Accordingly, the used product sales information of the acquaintance is provided to the prospective purchaser.

Furthermore, the customer review management unit 340 provides the prospective purchaser terminal 200 with a purchase condition comparison window configured to compare new product purchase conditions for purchasing a new product for the product to be purchased with used product purchase conditions for purchasing the used product of the acquaintance for the product to be purchased.

The customer review management unit 340 may display the ratio of a used product purchase price when the used product of the acquaintance is purchased for the product to be purchased to a new product purchase price when the new product is purchased for the product to be purchased in the purchase condition comparison window. More specifically, for example, when the used product purchase price when the used product of the acquaintance is purchased for the product to be purchased and the new product purchase price when the new product is purchased for the product to be purchased are compared with each other, the ratio of the used product purchase price to the new product purchase price is displayed in the purchase condition comparison window.

Accordingly, the prospective purchaser can become aware of the ratio of the used product purchase price to the new product purchase price, which is helpful in determining whether to purchase the used product.

Furthermore, when the used product purchase conditions are provided, it is preferred that information about the acquaintance who sells the used product is additionally provided. The reason for this is that the prospective purchaser needs to examine information about the acquaintance who sells the used product because the used product requires reliability. For example, a used product that is sold by an acquaintance who is superficially acquainted with the prospective purchaser has low reliability for the quality thereof, whereas a used product that is sold by an acquaintance who is a friend has high reliability for the quality thereof. Accordingly, it is necessary to examine information about an acquaintance who sells a used product.

Furthermore, when used product sales information matching the product to be purchased of the prospective purchaser is not present in used product sales information registered by an acquaintance of the prospective purchaser but corresponding used product sales information registered by a person associated with the acquaintance of the prospective purchaser (hereinafter referred to as the "third acquaintance") is present, as shown in FIG. 6, the customer review management unit 340 provides the used product sales information of the third acquaintance to the prospective purchaser terminal 200. For example, when the prospective purchaser desires to purchase product A, any acquaintance of the prospective purchaser may not sell a used product for the product A, but a third acquaintance acquainted with an acquaintance of the prospective purchaser may sell a used product for the product A. In this case, the used product sales information of the third acquaintance is provided to the prospective purchaser.

The reason for this is that purchasing the used product from the third acquaintance is more reliable than purchasing the used product from an unacquainted person.

However, since the prospective purchaser cannot directly know the third acquaintance, for example, the prospective purchaser cannot know whether or not the third acquaintance is an imposter, an evaluation of the third acquaintance is received from the acquaintance of the prospective purchaser, and is provided to the prospective purchaser terminal 200. Accordingly, the prospective purchaser may obtain information about the personality of the third acquaintance or the like from his or her acquaintance, and may receive help in deciding to purchase the used product that is sold by the third acquaintance.

Meanwhile, although the above-described cases are examples in that the present invention is used in online commerce in which an electronic commerce purchase is made, it will be apparent that the present invention may be applied to not only to online commerce but also offline commerce. In other words, the present invention may be used for a visit to an offline shop in conjunction with an online system. For example, when a user visits an Italian restaurant, the customer review information of an acquaintance may be provided to the user in advance.

An embodiment of the present invention is advantageous in that a more reliable opinion on a product can be provided via a customer review of and direct contact with an acquaintance who has purchased and used a product to be purchased.

An embodiment of the present invention is advantageous in that a prospective purchaser can increase the reliability of purchase decision making for a product to be purchased via a customer review and opinion of a reliable acquaintance.

An embodiment of the present invention is advantageous in that the reliability of the purchase decision making of an acquaintance can be improved by transferring a frank customer review to the acquaintance after purchasing a corresponding product earlier than the acquaintance by reference to information about a product of interest of the acquaintance and using the product.

The above-described embodiments described in the detailed description of the present invention are merely embodiments that are selected to help the understanding of those skilled in the art. The technical spirit of the present invention is not necessarily limited to these embodiments, and various modifications and alterations and other equivalent embodiments may be made without departing from the technical spirit of the present invention.

What is claimed is:

1. A product sales system utilizing a product purchase history, product of interest, and customer review of an acquaintance, the product sales system comprising:
    a former purchaser terminal adapted to be used by a former purchaser, and configured to receive a customer review for a purchased product from the former purchaser and to register the customer review with a product sales server;
    a prospective purchaser terminal adapted to be used by a prospective purchaser who desires to purchase a product, and configured to connect with the product sales server, to select a product to be purchased, to receive an acquaintance customer review, which is a customer review registered by an acquaintance of the prospective purchaser, among customer reviews of former purchasers allocated and registered for the selected product to be purchased from the product sales server, and to display the acquaintance customer review; and
    the product sales server configured to connect the former purchaser terminal and the prospective purchaser terminal via a communication network,
        wherein the product sales server:
        manages membership sign-up of the former purchaser and the prospective purchaser;
        stores product information for each product to be sold, and provides product information about a product, requested by the prospective purchaser, to the prospective purchaser terminal;
        determines information about the acquaintance of the prospective purchaser, the prospective purchaser desiring to purchase the selected product to be purchased, extracts the acquaintance customer review, registered by the acquaintance, from customer reviews for the product to be purchased, and matches the acquaintance customer review with the prospective purchaser;
        registers and stores the customer review registered by the former purchaser terminal for each product, and provides the acquaintance customer review of the acquaintance of the prospective purchaser to the prospective purchaser terminal; and
        manages payment and delivery information, entered for a product purchase by the prospective purchaser who has examined the acquaintance customer review,
        wherein the former purchaser terminal registers information about a product of interest, which has not been actually purchased and in which the former purchaser is interested, with the product sales server;
    wherein the product sales server is configured to register and store information about a product of interest of a member registered in the product sales server; and
    wherein the product sales server extracts the information about a product of interest, in which the acquaintance of the prospective purchaser is interested, from registered information about products of interests, and provides the extracted information about a product of interest to the prospective purchaser terminal,
    wherein determining the information about the acquaintance of the prospective purchaser is performed through matching of account information of a social network service (SNS) or a telephone number:
        by requesting, via an application program interface (API), SNS friend account information while providing information of the prospective purchaser to a SNS server, and receiving, via the API, the SNS friend account information of the prospective purchaser from the SNS server; or
        by requesting via, the API, a telephone number database (DB) of the prospective purchaser, registered in the prospective purchaser terminal, from the prospective purchaser terminal or by requesting, via the API, the telephone number DB of the prospective purchaser from a cloud server,
    wherein the product sales server is configured to provide a chat window that enables chatting to be made between the prospective purchaser and the acquaintance, the matching is performed with the information requested and provided by the API, and in response to determining the matching of the information, the chat window is presented on a terminal of the acquaintance and the prospective purchaser terminal by means of a chat window process call to the API provided by a SNS provider, and
    wherein a ratio of a used product purchase price to a new product purchase price is displayed in a purchase condition comparison window provided to the prospective purchaser terminal, the used product purchase price being a price for which a used product of the acquaintance is purchased for the product to be purchased and the new product purchase price being a price for which a new product is purchased for the product to be purchased.

2. The product sales system of claim 1, wherein the product sales server, when the prospective purchaser has purchased a product matching the customer review of the acquaintance or has purchased a product matching the information about a product of interest of the acquaintance earlier than the acquaintance, subtracts a preset amount of money from a product purchase money of the prospective purchaser, and provides points to the acquaintance as a reward.

3. The product sales system of claim 1, wherein the product sales server determines whether the former purchaser provides a product purchase history and a customer review to an acquaintance of the former purchaser, and, when the former purchaser does not want to provide the product purchase history and the customer review to the acquaintance of the former purchaser, excludes the purchase history and customer review information from matching of corresponding product information.

4. The product sales system of claim 1, wherein:
    the product sales server receives used product sales information from the former purchaser who desires to sell a purchased product as a used product, and stores the used product sales information; and when used product sales information matching the product to be purchased of the prospective purchaser is present in used product sales information registered by an acquaintance of the prospective purchaser, provides the matching used product sales information of the acquaintance to the prospective purchaser terminal.

5. The product sales system of claim 4, wherein the product sales server, when used product sales information matching the product to be purchased of the prospective purchaser is not present in used product sales information registered by the acquaintance of the prospective purchaser but corresponding used product sales information registered by a third acquaintance, who is a person associated with the acquaintance of the prospective purchaser, is present in used product sales information, provides the used product sales information of the third acquaintance to the prospective purchaser terminal, and receives an evaluation of the third acquaintance from the acquaintance of the prospective purchaser, and provides the evaluation of the third acquaintance to the prospective purchaser terminal.

\* \* \* \* \*